(12) United States Patent
Lin et al.

(10) Patent No.: US 11,516,781 B2
(45) Date of Patent: Nov. 29, 2022

(54) METHOD FOR TRANSMITTING CONTROL INFORMATION, NETWORK DEVICE, AND TERMINAL DEVICE

(71) Applicant: Guangdong OPPO Mobile Telecommunications Corp., Ltd., Guangdong (CN)

(72) Inventors: Yanan Lin, Dongguan (CN); Jia Shen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 151 days.

(21) Appl. No.: 16/872,173

(22) Filed: May 11, 2020

(65) Prior Publication Data
US 2020/0275434 A1 Aug. 27, 2020

Related U.S. Application Data

(63) Continuation of application No. PCT/CN2017/111468, filed on Nov. 16, 2017.

(51) Int. Cl.
*H04W 72/04* (2009.01)
*H04L 1/18* (2006.01)
*H04L 27/26* (2006.01)

(52) U.S. Cl.
CPC ....... *H04W 72/0413* (2013.01); *H04L 1/1812* (2013.01); *H04L 27/2605* (2013.01)

(58) Field of Classification Search
CPC ............. H04W 72/0413; H04W 72/04; H04W 72/1284; H04L 1/1812; H04L 27/2605;
(Continued)

(56) References Cited

U.S. PATENT DOCUMENTS 8,503,425 B2 * 8/2013 Chung ................ H04L 25/0226
370/349
10,560,229 B2 * 2/2020 Xiong ................... H04L 5/0055
(Continued)

FOREIGN PATENT DOCUMENTS

CN 103178926 A 6/2013
CN 104782208 A 7/2015
(Continued)

OTHER PUBLICATIONS

International Application No. PCT/CN2017/111468, International search report, dated Jun. 28, 2018, 2 pages.
Second Office Action issued in corresponding Chinese Application No. 20 20 10374282.7, dated Sep. 8, 2021, 12 pages.
First Office Action issued in corresponding India Application No. 202017021846, dated Nov. 8, 2021, 5 pages.
(Continued)

*Primary Examiner* — Ayaz R Sheikh
*Assistant Examiner* — Tarell A Hampton
(74) *Attorney, Agent, or Firm* — Bayes PLLC

(57) ABSTRACT

A method for transmitting control information, a network device, and a terminal device are provided. The method includes determining a cyclic shift value according to a configuration of an uplink control channel sequence; wherein the cyclic shift value is one of at least two cyclic shift values of the uplink control channel sequence and wherein the configuration of the uplink control channel sequence comprises at least one of an initial cyclic shift value, a cyclic shift difference value, or a quantity of cyclic shift values. The method also includes receiving uplink control information (UCI) from a terminal device according to the determined cyclic shift value.

14 Claims, 7 Drawing Sheets

100

Determine a configuration of an uplink control channel sequence of a terminal device, where the configuration of the uplink control channel sequence includes at least one of an initial cyclic shift value, a cyclic shift difference value, and a quantity of cyclic shift values — S110

Determine at least two cyclic shift values of the uplink control channel sequence according to the configuration of the uplink control channel sequence — S120

Determine, by using at least one of the at least two cyclic shift values, UCI sent by the terminal device — S130

(58) Field of Classification Search
CPC ... H04L 5/0055; H04L 5/0053; H04J 13/0074
See application file for complete search history.

(56) References Cited

U.S. PATENT DOCUMENTS

| | | | | |
|---|---|---|---|---|
| 2008/0298433 | A1* | 12/2008 | Tiirola | H04J 13/0062 375/132 |
| 2009/0232067 | A1* | 9/2009 | Pajukoski | H04W 72/0446 370/329 |
| 2012/0307758 | A1* | 12/2012 | Moon | H04L 5/0055 370/329 |
| 2013/0039285 | A1* | 2/2013 | Sorrentino | H04L 27/2613 370/329 |
| 2013/0279626 | A1 | 10/2013 | Noh et al. | |
| 2014/0105191 | A1* | 4/2014 | Yang | H04L 1/1867 370/336 |
| 2014/0169324 | A1* | 6/2014 | Seo | H04L 5/0037 370/329 |
| 2014/0301324 | A1 | 10/2014 | Cheng et al. | |
| 2016/0037491 | A1 | 2/2016 | Hwang et al. | |
| 2016/0226645 | A1 | 8/2016 | Kim et al. | |
| 2017/0019883 | A1 | 1/2017 | Nimbalker et al. | |
| 2017/0188352 | A1 | 6/2017 | Lee et al. | |
| 2018/0213457 | A1* | 7/2018 | Tang | H04W 36/0083 |
| 2020/0220698 | A1* | 7/2020 | Zhang | H04L 5/0044 |

FOREIGN PATENT DOCUMENTS

| | | | |
|---|---|---|---|
| CN | 105027481 A | 11/2015 | |
| CN | 106358296 A | 1/2017 | |
| CN | 106851837 A | 6/2017 | |
| CN | 106954261 A | 7/2017 | |
| CN | 107231690 A | 10/2017 | |
| EP | 2 787 674 A1 | 10/2014 | |
| JP | 2010503260 A | 1/2010 | |
| RU | 2628768 C2 | 8/2017 | |
| TW | 201404067 A | 1/2014 | |
| TW | 201503733 A | 1/2015 | |
| WO | WO-2008132073 A1 * | 11/2008 | ......... H04L 25/0226 |
| WO | 2017079539 A1 | 5/2017 | |
| WO | 2017167003 A1 | 10/2017 | |
| WO | 2017188012 A1 | 11/2017 | |
| WO | 2019049346 A1 | 3/2019 | |

OTHER PUBLICATIONS

First Office Action issued in corresponding Japanese Application No. 2020-527018, dated Nov. 26, 2021, 33 pages.
Notification to Grant Patent Right for Invention, issued in corresponding Chinese Application No. 202010374282.7, dated Nov. 30, 2021, 8 pages.
"Discussion on 1-symbol short-PUCCH for UCI of up to 2 bits", Agenda Item: 6.3.2.1.1, Source: Panasonic, 3GPP TSG RAN WG1 Meeting NR-AH#3, R1-1716119, Nagoya, Japan, Sep. 18-21, 2017, 8 pages.
"2-symbol NR PUCCH", Agenda item: 7.3.2.1.3, Source: Intel Corporation, 3GPP TSG RAN WG1 Meeting 90bis, R1-1717384, Prague, CZ, Oct. 9-13, 2017, 4 pages.
First Office Action issued in corresponding Chinese Application No. 20 20 10374282.7, dated Jun. 16, 2021, 19 pages.
First Office Action issued in corresponding Canadian Application No. 3,082,970, dated Jul. 7, 2021, 5 pages.
Request for SIPO Patent Priority Review issued in corresponding Chinese Application No. 20 20 10374282.7, dated Apr. 21, 2021, 6 pages.
Supplementary European Search Report issued in corresponding European Application No. EP 17 93 2547, dated Oct. 2, 2020, 12 pages.
First Office Action issued in corresponding Russian Application No. 2020119587/07 (033218), dated Dec. 7, 2020, 14 pages.
"CS hopping for DM RS", Source: Nokia Siemens Networks, Nokia, Agenda Item: 6.1.2., 3GPP TSG RAN WG1 Meeting #52, R1-080920, Sorrento, Italy, Feb. 11-15, 20018, 3 pages.
Summary of Short PUCCH structure (7.3.2.1), Source: Ericsson, Agenda 7.3.2.1., 3GPP TSG RAN WG1 Meeting AH_NR#3, R1-1718812, Nagoya, Japan, Sep. 18-21, 2017, 13 pages.
First Office Action issued in corresponding Korean Application No. 10-2020-7015886, dated Mar. 16, 2022, 12 pages.
"Design of short PUCCH for UCI of up to 2 bits for NR", Source: LG Electronics, 3GPP TSG RAN WG1 Meeting 90bis, R1-1717956, Prague, CZ, Oct. 9-13, 2017, 7 pages.
First Office Action issued in corresponding Taiwanese Application No. 107140909, dated Nov. 30, 2021, 12 pages.
First Office Action issued in corresponding Singapore Application No. 11202004619R, dated Jan. 20, 2022, 8 pages.

\* cited by examiner

100

```
┌─────────────────────────────────────────────────┐
│ Determine a configuration of an uplink control channel │
│ sequence of a terminal device, where the configuration of │
│ the uplink control channel sequence includes at least one │──S110
│ of an initial cyclic shift value, a cyclic shift difference │
│ value, and a quantity of cyclic shift values │
└─────────────────────────────────────────────────┘
                         │
┌─────────────────────────────────────────────────┐
│ Determine at least two cyclic shift values of the uplink │
│ control channel sequence according to the configuration │──S120
│ of the uplink control channel sequence │
└─────────────────────────────────────────────────┘
                         │
┌─────────────────────────────────────────────────┐
│ Determine, by using at least one of the at least two cyclic │──S130
│ shift values, UCI sent by the terminal device │
└─────────────────────────────────────────────────┘
```

```
┌─────────────────────────────────────────────┐
│ Determine a configuration of an uplink control channel
│ sequence, where the configuration of the uplink control
│ channel sequence includes at least one of an initial cyclic │─ S210
│ shift value, a cyclic shift difference value, and a quantity
│ of cyclic shift values
└─────────────────────────────────────────────┘
                         │
┌─────────────────────────────────────────────┐
│ Determine at least two cyclic shift values of the uplink
│ control channel sequence according to the configuration │─ S220
│ of the uplink control channel sequence
└─────────────────────────────────────────────┘
                         │
┌─────────────────────────────────────────────┐
│ Send UCI to a network device by using at least one of the │─ S230
│ at least two cyclic shift values
└─────────────────────────────────────────────┘
```

*FIG. 3*

METHOD FOR TRANSMITTING CONTROL INFORMATION, NETWORK DEVICE, AND TERMINAL DEVICE

CROSS-REFERENCES TO RELATED APPLICATIONS

This application is a continuation of and claims priority to International Patent Application PCT/CN2017/111468, filed Nov. 16, 2017, the contents of which is hereby incorporated by reference in its entirety.

BACKGROUND OF THE INVENTION

Technical Field

This application relates to the field of communications, and in particular, to a method for transmitting control information, a network device, and a terminal device.

Related Art

A current new radio (NR) system can support physical uplink control channels (PUCCH) of two time lengths, namely, a short-PUCCH and a long-PUCCH. The short-PUCCH generally includes one or two time domain symbols. The long-PUCCH includes four to fourteen time domain symbols. The two types of PUCCHs can both carry uplink control information (UCI) that has one or two bits or has more than two bits.

A sequence indication method may be usually used for UCI that has one or two bits. For example, two cyclic shifts of a same sequence may be used to indicate acknowledgement/negative-acknowledgement (ACK/NACK) information that occupies one bit. However, how to determine a cyclic shift value is still a problem that urgently needs to be resolved.

SUMMARY OF THE INVENTION

This application provides a method for transmitting control information, a network device, and a terminal device, so that a cyclic shift value can be flexibly configured.

According to a first aspect, a method for transmitting control information is provided, the method including: determining a configuration of an uplink control channel sequence of a terminal device, where the configuration of the uplink control channel sequence includes at least one of an initial cyclic shift value, a cyclic shift difference value, and a quantity of cyclic shift values; determining at least two cyclic shift values of the uplink control channel sequence according to the configuration of the uplink control channel sequence; and determining, by using at least one of the at least two cyclic shift values, UCI sent by the terminal device.

Therefore, in the method for transmitting control information in the embodiments of this application, a network device determines a configuration of an uplink control channel sequence configured by a terminal device, and determines at least two cyclic shift values of the uplink control channel sequence according to at least one of an initial cyclic shift value, a cyclic shift difference value, and a quantity of cyclic shift values included in the configuration of the uplink control channel sequence, to determine UCI sent by the terminal device. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

With reference to the first aspect, in an implementation of the first aspect, after the determining a configuration of an uplink control channel sequence of a terminal device, the method further includes: sending at least one of the configuration of the uplink control channel sequence to the terminal device.

With reference to the first aspect and the foregoing implementations of the first aspect, in another implementation of the first aspect, the determining at least two cyclic shift values of the uplink control channel sequence according to the configuration of the uplink control channel sequence includes: determining the at least two cyclic shift values according to the configuration of the uplink control channel sequence by using a modulo operation.

With reference to the first aspect and the foregoing implementations of the first aspect, in another implementation of the first aspect, the determining at least two cyclic shift values of the uplink control channel sequence according to the configuration of the uplink control channel sequence includes: determining the $i^{th}$ cyclic shift value $\Phi(i)$ of the at least two cyclic shift values according to the following formula:

$$\Phi(i)=(\alpha+i*\delta) \bmod N,$$

where $\alpha$, $i$, $\delta$, and $N$ are all integers, $\alpha$ represents the initial cyclic shift value, $\delta$ represents the cyclic shift difference value, $N$ represents a quantity of cyclic shifts that can be applied to the uplink control channel sequence, $0 \leq \alpha \leq N$, $0 \leq i < N$, and $0 < \delta < N$.

With reference to the first aspect and the foregoing implementations of the first aspect, in another implementation of the first aspect, the configuration of the uplink control channel sequence further includes a hopping parameter.

With reference to the first aspect and the foregoing implementations of the first aspect, in another implementation of the first aspect, the determining at least two cyclic shift values of the uplink control channel sequence according to the configuration of the uplink control channel sequence includes: determining the $i^{th}$ cyclic shift value $\Phi(i)$ of the at least two cyclic shift values according to the following formula:

$$\Phi(i)=(\alpha+i*\delta+h) \bmod N,$$

where $\alpha$, $i$, $\delta$, and $N$ are all integers, $\alpha$ represents the initial cyclic shift value, $\delta$ represents the cyclic shift difference value, $N$ represents a quantity of cyclic shifts that can be applied to the uplink control channel sequence, $h$ represents a hopping count determined according to the hopping parameter, $0 \leq \alpha \leq N$, $0 \leq i < N$, $0 < \delta < N$, and $0 \leq h < N$.

With reference to the first aspect and the foregoing implementations of the first aspect, in another implementation of the first aspect, the determining a configuration of an uplink control channel sequence of a terminal device includes: determining the quantity of cyclic shift values and/or the cyclic shift difference value according to a quantity of data blocks that are fed back by the terminal device.

With reference to the first aspect and the foregoing implementations of the first aspect, in another implementation of the first aspect, the uplink control channel sequence is a sequence carrying control information.

With reference to the first aspect and the foregoing implementations of the first aspect, in another implementation of the first aspect, the determining, according to at least one of the at least two cyclic shift values, UCI sent by the terminal device includes: receiving a target uplink control channel sequence sent by the terminal device; determining, in the at least two cyclic shift values, a target cyclic shift value corresponding to the target uplink control channel sequence; and determining corresponding UCI according to the target cyclic shift value.

With reference to the first aspect and the foregoing implementations of the first aspect, in another implementation of the first aspect, the at least two cyclic shift values are in a one-to-one correspondence with at least two states of the UCI.

Optionally, the at least two states of the UCI include an ACK/a NACK of at least one data block that needs to be fed back.

With reference to the first aspect and the foregoing implementations of the first aspect, in another implementation of the first aspect, the determining corresponding UCI according to the target cyclic shift value includes: determining a target state of the corresponding UCI according to the target cyclic shift value.

With reference to the first aspect and the foregoing implementations of the first aspect, in another implementation of the first aspect, the at least two states of the UCI include a first state, and the initial cyclic shift value corresponds to the first state.

Therefore, in the method for transmitting control information in the embodiments of this application, a network device determines a configuration of an uplink control channel sequence configured by a terminal device, and determines at least two cyclic shift values of the uplink control channel sequence according to at least one of an initial cyclic shift value, a cyclic shift difference value, and a quantity of cyclic shift values included in the configuration of the uplink control channel sequence by using a modulo operation, to determine UCI indicated by the received uplink control channel sequence sent by the terminal device. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

According to a second aspect, a method for transmitting control information is provided, the method including: determining a configuration of an uplink control channel sequence, where the configuration of the uplink control channel sequence includes at least one of an initial cyclic shift value, a cyclic shift difference value, and a quantity of cyclic shift values; S220, determining at least two cyclic shift values of the uplink control channel sequence according to the configuration of the uplink control channel sequence; and S230, sending UCI to a network device by using at least one of the at least two cyclic shift values.

Therefore, in the method for transmitting control information in the embodiments of this application, a terminal device determines a configuration of an uplink control channel sequence, and determines at least two cyclic shift values of the uplink control channel sequence according to at least one of an initial cyclic shift value, a cyclic shift difference value, and a quantity of cyclic shift values included in the configuration of the uplink control channel sequence, to determine UCI that needs to be sent. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

With reference to the second aspect, in an implementation of the second aspect, the determining a configuration of an uplink control channel sequence includes: receiving the configuration of the uplink control channel sequence sent by the network device.

With reference to the second aspect and the foregoing implementations of the second aspect, in another implementation of the second aspect, the determining at least two cyclic shift values of the uplink control channel sequence according to the configuration of the uplink control channel sequence includes: determining the at least two cyclic shift values according to the configuration of the uplink control channel sequence by using a modulo operation.

With reference to the second aspect and the foregoing implementations of the second aspect, in another implementation of the second aspect, the determining at least two cyclic shift values of the uplink control channel sequence according to the configuration of the uplink control channel sequence includes: determining the $i^{th}$ cyclic shift value $\Phi(i)$ of the at least two cyclic shift values according to the following formula:

$$\Phi(i)=(\alpha+i*\delta) \bmod N,$$

where $\alpha$, $i$, $\delta$, and $N$ are all integers, $\alpha$ represents the initial cyclic shift value, $\delta$ represents the cyclic shift difference value, $N$ represents a quantity of cyclic shifts that can be applied to the uplink control channel sequence, $0 \leq \alpha \leq N$, $0 \leq i < N$, and $0 < \delta < N$.

With reference to the second aspect and the foregoing implementations of the second aspect, in another implementation of the second aspect, the configuration of the uplink control channel sequence further includes a hopping parameter.

With reference to the second aspect and the foregoing implementations of the second aspect, in another implementation of the second aspect, the determining at least two cyclic shift values of the uplink control channel sequence according to the configuration of the uplink control channel sequence includes: determining the $i^{th}$ cyclic shift value $\Phi(i)$ of the at least two cyclic shift values according to the following formula:

$$\Phi(i)=(\alpha+i*\delta+h) \bmod N,$$

where $\alpha$, $i$, $\delta$, and $N$ are all integers, $\alpha$ represents the initial cyclic shift value, $\delta$ represents the cyclic shift difference value, $N$ represents a quantity of cyclic shifts that can be applied to the uplink control channel sequence, $h$ represents a hopping count determined according to the hopping parameter, $0 \leq \alpha \leq N$, $0 \leq i < N$, $0 < \delta < N$, and $0 \leq h < N$.

With reference to the second aspect and the foregoing implementations of the second aspect, in another implementation of the second aspect, the method further includes: determining the cyclic shift difference value and/or the quantity of cyclic shift values according to a quantity of data blocks that are fed back.

With reference to the second aspect and the foregoing implementations of the second aspect, in another implementation of the second aspect, the uplink control channel sequence is a sequence carrying control information.

With reference to the second aspect and the foregoing implementations of the second aspect, in another implementation of the second aspect, the sending UCI to a network device according to at least one of the at least two cyclic shift values includes: determining, in the at least two cyclic shift values, a target cyclic shift value corresponding to the UCI; determining a corresponding target uplink control channel sequence according to the target cyclic shift value; and sending the target uplink control channel sequence to the network device, where the target uplink control channel sequence is used to indicate the UCI.

With reference to the second aspect and the foregoing implementations of the second aspect, in another implementation of the second aspect, the at least two cyclic shift values are in a one-to-one correspondence with at least two states of the UCI.

Optionally, the at least two states of the UCI include an ACK/a NACK of at least one data block that needs to be fed back.

With reference to the second aspect and the foregoing implementations of the second aspect, in another implementation of the second aspect, the determining, in the at least two cyclic shift values, a target cyclic shift value corresponding to the UCI includes: determining, in the at least two cyclic shift values, a target cyclic shift value corresponding to a target state of the UCI, where the target uplink control channel sequence is used to indicate the target state.

With reference to the second aspect and the foregoing implementations of the second aspect, in another implementation of the second aspect, the at least two states of the UCI include a first state, and the initial cyclic shift value corresponds to the first state.

Therefore, in the method for transmitting control information in the embodiments of this application, a terminal device determines a configuration of an uplink control channel sequence, and determines at least two cyclic shift values of the uplink control channel sequence according to at least one of an initial cyclic shift value, a cyclic shift difference value, and a quantity of cyclic shift values included in the configuration of the uplink control channel sequence by using a modulo operation, to determine a target cyclic shift value corresponding to UCI that needs to be sent and send the uplink control channel sequence by using the target cyclic shift value. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

According to a third aspect, a network device is provided, configured to perform the method according to any one of the first aspect or the possible implementations of the first aspect. Specifically, the network device includes units configured to perform the method according to any one of the first aspect or the possible implementations of the first aspect.

According to a fourth aspect, a terminal device is provided, configured to perform the method according to any one of the second aspect or the possible implementations of the second aspect. Specifically, the terminal device includes units configured to perform the method according to any one of the second aspect or the possible implementations of the second aspect.

According to a fifth aspect, a network device is provided, including a storage unit and a processor. The storage unit is configured to store an instruction. The processor is configured to execute the instruction stored in the memory, and when the processor executes the instruction stored in the memory, the execution enables the processor to perform the method according to any one of the first aspect or the possible implementations of the first aspect.

According to a sixth aspect, a terminal device is provided, including a storage unit and a processor. The storage unit is configured to store an instruction. The processor is configured to execute the instruction stored in the memory, and when the processor executes the instruction stored in the memory, the execution enables the processor to perform the method according to any one of the second aspect or the possible implementations of the second aspect.

According to a seventh aspect, a computer readable medium is provided, configured to store a computer program. The computer program includes an instruction used to perform the method according to any one of the first aspect or the possible implementations of the first aspect.

According to an eighth aspect, a computer readable medium is provided, configured to store a computer program. The computer program includes an instruction used to perform the method according to any one of the second aspect or the possible implementations of the second aspect.

According to a ninth aspect, a computer program product including an instruction is provided. When a computer executes the instruction of the computer program product, the computer performs the method for transmitting control information according to any one of the first aspect or the possible implementations of the first aspect. Specifically, the computer program product may be executed on the network device in the third aspect.

According to a tenth aspect, a computer program product including an instruction is provided. When a computer executes the instruction of the computer program product, the computer performs the method for transmitting control information according to any one of the second aspect or the possible implementations of the second aspect. Specifically, the computer program product may be executed on the terminal device in the fourth aspect.

BRIEF DESCRIPTION OF THE DRAWINGS

FIG. 1 is a schematic flowchart of a method for transmitting control information according to an embodiment of this application.

FIG. 3 is another schematic flowchart of a method for transmitting control information according to an embodiment of this application.

DETAILED DESCRIPTION OF THE INVENTION

Figure 2:
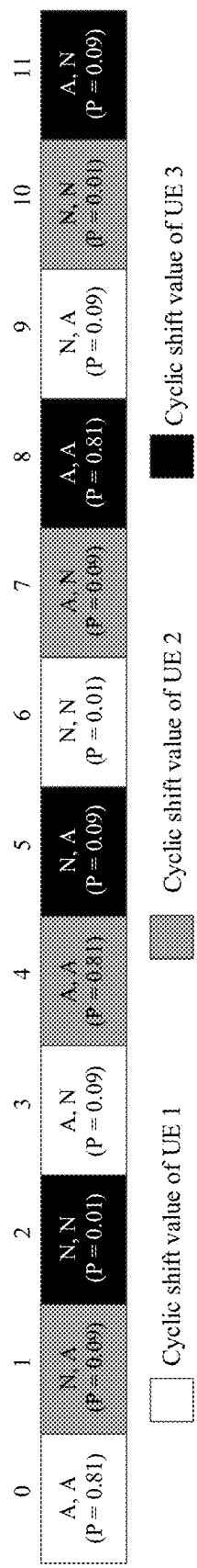
FIG. 2 is a distribution diagram of cyclic shift values configured for different terminal devices according to an embodiment of this application.

The technical solutions according to embodiments of this application are described below with reference to the accompanying drawings.

The technical solutions according to the embodiments of this application may be applied to a variety of communications systems, such as a Global System for Mobile communications (GSMC) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communications system, a future 5$^{th}$ generation (5G) system, an NR system or the like.

In the embodiments of this application, a terminal device may be user equipment (UE), an access terminal, a subscriber unit, a subscriber station, a mobile station, a mobile console, a remote station, a remote terminal, a mobile device, a user terminal, a terminal, a wireless communications device, a user agent or a user apparatus. The terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN) or the like.

In the embodiments of this application, a network device may be a device configured to communicate with the terminal device. The network device may be a base transceiver station (BTS) in GSM or CDMA, a NodeB (NB) in a WCDMA system, an evolved NodeB (eNB or eNodeB) in an LTE system, or a wireless controller in a cloud radio access network (CRAN) scenario. Alternatively, the network device may be a relay station, an access point, an in-vehicle device, a wearable device, a network device in a future 5G network, or a network device in a future evolved PLMN network. This is not limited in the embodiments of this application.

In the embodiments of this application, the network device may be an access network device, for example, may be a base station, a transmit and receive point (TRP) or an access point. The base station may be a base transceiver station (Base Transceiver Station, BTS) in GSM or CDMA, or may be a NodeB (NodeB) in WCDMA, or may be an evolved Node B (eNB or e-NodeB) in LTE, or may be a gNB in NR or 5G. This is not specifically limited in the embodiments of this application.

FIG. 1 is a schematic flowchart of a method 100 for transmitting control information according to an embodiment of this application. The method 100 may be performed by a network device. As shown in FIG. 1, the method 100 includes: S110. determining a configuration of an uplink control channel sequence of a terminal device, where the configuration of the uplink control channel sequence includes at least one of an initial cyclic shift value, a cyclic shift difference value, and a quantity of cyclic shift values; S120, determining at least two cyclic shift values of the uplink control channel sequence according to the configuration of the uplink control channel sequence; and S120, determining, according to at least one of the at least two cyclic shift values, UCI sent by the terminal device.

It should be understood that, the uplink control channel sequence in this embodiment of this application may be a sequence used to carry control information. UCI corresponding to the uplink control channel sequence may include ACK/NACK information, for example, hybrid automatic repeat request (HARQ) ACK/NACK information. UCI corresponding to the uplink control channel sequence may include an uplink scheduling request (SR). UCI corresponding to the uplink control channel sequence may include channel state information (CSI). This embodiment of this application is not limited thereto.

In this embodiment of this application, a network device determines a configuration of an uplink control channel sequence of a terminal device, and may determine at least two cyclic shift values of the uplink control channel sequence according to the configuration of the uplink control channel sequence. The configuration of the uplink control channel sequence may include an initial cyclic shift value. The initial cyclic shift value may be any cyclic shift value determined in the at least two cyclic shift values. The configuration of the uplink control channel sequence may further include a cyclic shift difference value. The cyclic shift difference value may be a difference between any two adjacent cyclic shift values of the at least two cyclic shift values when the at least two cyclic shift values are arranged in an order of value. The configuration of the uplink control channel sequence may further include the quantity of cyclic shift values. The quantity of cyclic shift values is a quantity of the at least two cyclic shift values, or the quantity of cyclic shift values may be greater than the quantity of the at least two cyclic shift values. This embodiment of this application is not limited thereto.

Optionally, the initial cyclic shift value in the configuration of the uplink control channel sequence may be configured by the network device for the terminal device. Specifically, the network device may configure the same initial cyclic shift value or different initial cyclic shift values for different terminal devices by looking up a preset table or in another manner. The initial cyclic shift value may be any value in a range of a quantity of cyclic shifts that can be applied to the uplink control channel sequence. For example, for any terminal device, if a range of a quantity of cyclic shifts of the uplink control channel sequence of the terminal device is 0 to 11, any number of 0 to 11 may be used as the initial cyclic shift value.

Optionally, the cyclic shift difference value and/or the quantity of cyclic shift values in the configuration of the uplink control channel sequence may be determined according to a quantity of data blocks that need to be fed back by the terminal device. For example, it is assumed that the UCI sent by the terminal device is ACK/NACK information of at least one data block that needs to be fed back. Specifically, when the terminal device needs to feed back ACK/NACK information of one data block, one bit may be used for feedback. The one bit may correspond to two cyclic shift values. The two cyclic shift values respectively correspond to the ACK information and the NACK information. When the terminal device needs to feed back ACK/NACK information of two data blocks, two bits may be used for feedback. The two bits may correspond to four cyclic shift values. The four cyclic shift values respectively correspond to four combinations of the ACK/NACK information of the data blocks. ACK/NACK information of another quantity of data blocks is deduced by analogy. For another example, the network device may further determine the cyclic shift difference value according to the quantity of cyclic shift values. For example, when there are two cyclic shift values, the cyclic shift difference value is set to 6. When there are four cyclic shift values, the cyclic shift difference value is 3. However, this embodiment of this application is not limited thereto.

Optionally, after determining the configuration of the uplink control channel sequence of the terminal device, the network device may further send at least one of the configuration of the uplink control channel sequence to the terminal device, so that the terminal device may determine at least two cyclic shift values of the uplink control channel sequence according to the configuration of the uplink control channel sequence. The at least two cyclic shift values have a one-to-one correspondence with at least two states of the UCI. The terminal device determines, according to at least one of the at least two cyclic shift values, a target cyclic shift value corresponding to a target state of the UCI to be sent, to determine a target uplink control channel sequence corresponding to the target cyclic shift value and send the target uplink control channel sequence to the network device.

Correspondingly, the network device receives a target uplink control channel sequence sent by the terminal device, determines the configuration of the uplink control channel sequence of the terminal device, and determines at least two cyclic shift values of the uplink control channel sequence according to the configuration of the uplink control channel sequence. The network device detects the received target uplink control channel sequence. Because the target uplink control channel sequence is a sequence obtained when the terminal device uses the target cyclic shift value of the at least two cyclic shift values, the network device may determine the target cyclic shift value corresponding to the target uplink control channel sequence sent by the terminal device, to determine a target state of the UCI corresponding to the target cyclic shift value.

It should be understood that, that the network device determines the configuration of the uplink control channel sequence, and determines at least two cyclic shift values according to the configuration of the uplink control channel sequence includes: determining, by the network device, the at least two cyclic shift values according to the configuration of the uplink control channel sequence by using a modulo operation. Specifically, the modulo operation may be implemented in the following manners. However, this embodiment of this application is not limited thereto.

Optionally, in an embodiment, the determining, by the network device, the at least two cyclic shift values according to the configuration of the uplink control channel sequence by using a modulo operation includes: determining, according to a value relationship between the initial cyclic shift value in the configuration of the uplink control channel sequence and the cyclic shift difference value, the at least two cyclic shift values in the range of the quantity of cyclic shifts that can be applied to the uplink control channel sequence. Specifically, when the initial cyclic shift value is less than the cyclic shift difference value, in the range of the quantity of cyclic shifts that can be applied to the uplink control channel sequence, a sum of the initial cyclic shift value and an integer multiple of the cyclic shift difference value is sequentially calculated to obtain the at least two cyclic shift values. For example, it is assumed that the initial cyclic shift value is 1, the cyclic shift difference value is 3, and the range of the quantity of cyclic shifts that can be applied to the uplink control channel sequence is 0 to 11. Because 1<3, in the range of 1 to 11, a sum of 1 and an integer multiple of 3 is sequentially calculated. To be specific, four cyclic shift values, namely, 1, 1+3*1=4, 1+3*2=7, and 1+3*3=10 are obtained.

In addition, when the initial cyclic shift value is greater than or equal to the cyclic shift difference value, in the range of the quantity of cyclic shifts that can be applied to the uplink control channel sequence, a sum of the initial cyclic shift value and an integer multiple of the cyclic shift difference value and a difference between the initial cyclic shift value and the integer multiple of the cyclic shift difference value are both sequentially calculated to obtain the at least two cyclic shift values. For example, it is assumed that the initial cyclic shift value is 8, the cyclic shift difference value is 3, and the range of the quantity of cyclic shifts that can be applied to the uplink control channel sequence is 0 to 11. Because 8>3, in the range of 1 to 11, a sum of 8 and an integer multiple of 3 is sequentially calculated. To be specific, 8 and 8+3*1=11 are two cyclic shift values. A difference between 8 and an integer multiple of 3 is then sequentially calculated. That is, 8, 8−3*1=5, and 8−3*2=2 are three cyclic shift values. Therefore, four obtained cyclic shift values are 2, 5, 8, and 11.

Optionally, in an embodiment, the determining, by the network device, the at least two cyclic shift values according to the configuration of the uplink control channel sequence by using a modulo operation further includes: determining, by the network device according to the foregoing formula (1), to indicate the $i^{th}$ cyclic shift value in the two cyclic shift values:

$$\Phi(i)=(\alpha+i*\delta)\mod N \qquad (1),$$

where i is a sequence number of a cyclic shift value, i may be sequentially a value between 0 and the quantity of cyclic shift values, for example, there are a total of four cyclic shift values, and i may be sequentially 0, 1, 2, and 3; α represents the initial cyclic shift value, and α may be any value in the range of the quantity of cyclic shifts that can be applied to the uplink control channel sequence; and δ represents the cyclic shift difference value; and N represents the quantity of cyclic shifts that can be applied to the uplink control channel sequence, that is, a quantity in the range of the quantity of cyclic shifts that can be applied to the uplink control channel sequence. N may be specified in a protocol or configured by using signaling. N may be configured explicitly or implicitly by using signaling.

For example, it is assumed that the network device configures a PUCCH resource 1 for the terminal device. The range of the quantity of cyclic shifts that can be applied to the uplink control channel sequence of the terminal device is 0 to 11. There are a total of 12 values. That is, N=12. A starting cyclic shift value is α=0. When the terminal device needs to feed back one bit of ACK/NACK information, there are two corresponding cyclic shift values. To be specific, i may be sequentially 0 and 1. Correspondingly, the cyclic shift difference value may be set to δ=6. In this case, $\Phi(0)=(0+0*6) \mod 12=0$, and $\Phi(1)=(0+1*6) \mod 12=6$. That is, two cyclic shift values 0 and 6 are obtained. When the terminal device needs to feed back two bits of ACK/NACK information, there are four corresponding cyclic shift values. To be specific, i may be sequentially 0, 1, 2, and 3. Correspondingly, the cyclic shift difference value may be set to δ=3. In this case, $\Phi(0)=(0+0*3) \mod 12=0$, $\Phi(1)=(0+1*3) \mod 12=3$, $\Phi(2)=(0+2*3) \mod 12=6$, and $\Phi(3)=(0+3*3) \mod 12=9$. That is, four cyclic shift values 0, 3, 6, and 9 are obtained.

For another example, it is assumed that the network device configures a PUCCH resource 2 for another terminal device. The range of the quantity of cyclic shifts that can be applied to the uplink control channel sequence of the terminal device is still 0 to 11, and there are a total of 12 values. That is, N=12. A starting cyclic shift value is α=9. When the terminal device needs to feed back one bit of ACK/NACK information, there are two corresponding cyclic shift values. To be specific, i may be sequentially 0 and 1. Correspondingly, the cyclic shift difference value may be set to δ=6. In this case, $\Phi(0)=(9+0*6) \mod 12=9$, and $\Phi(1)=(9+1*6) \mod 12=3$. That is, two cyclic shift values 9 and 3 are obtained. When the terminal device needs to feed back two bits of ACK/NACK information, there are four corresponding cyclic shift values. To be specific, i may be sequentially 0, 1, 2, and 3. Correspondingly, the cyclic shift difference value may be set to δ=3. In this case, Φ(0)=(9+0*3) mod 12=9, Φ(1)=(9+1*3) mod 12=0, Φ(2)=(9+2*3) mod 12=3, and Φ(3)=(9+3*3) mod 12=6. That is, four cyclic shift values 9, 0, 3, and 6 are obtained.

Optionally, in an embodiment, the configuration of the uplink control channel sequence may further include a hopping parameter, and may determine a hopping count according to the hopping parameter. Correspondingly, the determining, by the network device, the at least two cyclic shift values according to the configuration of the uplink control channel sequence by using a modulo operation further includes: determining, by the network device according to the foregoing formula (2), to indicate the $i^{th}$ cyclic shift value in the two cyclic shift values:

$$\Phi(i)=(\alpha+i*\delta+h) \bmod N \qquad (2),$$

where i is a sequence number of a cyclic shift value, i may be sequentially a value between 0 and the quantity of cyclic shift values, for example, there are a total of four cyclic shift values, and i may be sequentially 0, 1, 2, and 3; α represents the initial cyclic shift value, and α may be any value in the range of the quantity of cyclic shifts that can be applied to the uplink control channel sequence; δ represents the cyclic shift difference value; and N represents the quantity of cyclic shifts that can be applied to the uplink control channel sequence, that is, a quantity in the range of the quantity of cyclic shifts that can be applied to the uplink control channel sequence, and N may be specified in a protocol or configured by using signaling. N may be configured explicitly or implicitly by using signaling; and h is the hopping count, and h may be a function of the hopping parameter. For example, the hopping parameter may be a time domain identifier t. In this case, h=h(t). Optionally, the time domain identifier may be time, and may be a quantity of symbols, a subframe number or another time domain identifier. This embodiment of this application is not limited thereto.

For example, it is assumed that the network device configures a PUCCH resource 3 for the terminal device. The range of the quantity of cyclic shifts that can be applied to the uplink control channel sequence of the terminal device is 0 to 11. There are a total of 12 values. That is, N=12. A starting cyclic shift value is α=3. A hopping value satisfies h(t), where t is the hopping parameter that identifies a time domain identifier. When the terminal device needs to feed back one bit of ACK/NACK information, there are two corresponding cyclic shift values. To be specific, i may be sequentially 0 and 1. Correspondingly, the cyclic shift difference value may be set to δ=6. In this case, two obtained cyclic shift values are Φ(0)=(3+*6+h(t)) mod 12=(3+h(t)) mod 12 and Φ(1)=(3+1*6+h(t)) mod 12=(9+h(t)) mode 12. If it is calculated that h(t)=2, two cyclic shift values 5 and 11 are obtained.

When the terminal device needs to feed back two bits of ACK/NACK information, there are four corresponding cyclic shift values. To be specific, i may be sequentially 0, 1, 2, and 3. Correspondingly, the cyclic shift difference value may be set to δ=3. In this case, four obtained cyclic shift values are Φ(0)=(3+0*3+h(t)) mod 12=(3+h(t)) mod 12, Φ(1)=(3+1*3+h(t)) mod 12=(6+h(t)) mod 12, Φ(2)=(3+2*3+h(t)) mod 12=(9+h(t)) mod 12, and Φ(3)=(3+3*3+h(t)) mod 12=h(t) mod 12. If it is calculated that h(t)=1, four obtained cyclic shift values are 4, 7, 10, and 1.

Optionally, in an embodiment, the determining, by the network device, the at least two cyclic shift values according to the configuration of the uplink control channel sequence by using a modulo operation includes: acquiring, by the network device according to the initial cyclic shift value in the configuration of the uplink control channel sequence, the at least two cyclic shift values by looking up a table. Specifically, the at least two cyclic shift values corresponding to each configuration of the uplink control channel sequence are determined according to different configurations of the uplink control channel sequence, for example, according to different initial cyclic shift values, to generate a table. When the network device determines the initial cyclic shift value, the at least two cyclic shift values corresponding to the initial cyclic shift value may be obtained by looking up the table.

It should be understood that, in this embodiment of this application, the range of the quantity of cyclic shifts that can be applied to the uplink control channel sequence may correspond to one physical resource block (PRB). Specifically, for example, the ACK/NACK information included by the UCI may correspond to one PRB. In this case, the at least two cyclic shift values are determined in a range of a quantity of cyclic shifts that can be applied to the uplink control channel sequence in the PRB. For another example, an SR included in the UCI may correspond to another PRB. In this case, the at least two cyclic shift values are determined in a range of a quantity of cyclic shifts that can be applied to in the uplink control channel sequence in the another PRB. In addition, a quantity of combinations of uplink control channel sequences corresponding to the two PRBs is equal to a product of multiplying the at least two cyclic shift values of the PRBs corresponding to the ACK/NACK information by the at least two cyclic shift values of PRBs corresponding to the SR.

For example, the two bits of ACK/NACK information may correspond to the $n^{th}$ PRB. Four cyclic shift values are determined in the range of the quantity of cyclic shifts that can be applied to the uplink control channel sequence corresponding to the PRB. One bit of the SR may correspond to the $(n+m)^{th}$ PRB. Two cyclic shift values are the determined range of the quantity of cyclic shifts that can be applied to the uplink control channel sequence corresponding to the PRB. In this case, there are a total of 2*4=8 combinations of the sequences corresponding to the two PRBs. n may be determined by using a PUCCH resource configuration indication, and m may be obtained according to a predefined rule. For example, when a PUCCH occupies a total of N PRBs, m=N+1.

In this embodiment of this application, the at least two cyclic shift values correspond to at least two states of the UCI. Specifically, a state of UCI corresponding to each cyclic shift value may be determined according to a value order of the at least two cyclic shift values. Alternatively, a state of UCI corresponding to each cyclic shift value may be determined according to a determining sequence of the at least two cyclic shift values.

Optionally, the state of the UCI corresponding to each cyclic shift value is determined according to the value order of the at least two cyclic shift values. Specifically, the determined at least two cyclic shift values are arranged according to a value order to sequentially correspond to states of each UCI. For example, the formula (1) or (2) is used to determine the at least two cyclic shift values. In this case, the at least two cyclic shift values are Φ(0), Φ(1), Φ(2), . . . , and in ascending order, the at least two cyclic shift values are Φ(1), Φ(0), Φ(3), . . . , so that according to the value order of the at least two cyclic shift values, there are at least two corresponding states of the UCI.

For example, for one bit of ACK/NACK information, a state ACK and a state NACK correspond to two cyclic shift values. It is assumed that the formula (1) or (2) is used to determine a cyclic shift value. The maximum value corresponds to the ACK, and the minimum value corresponds to the NACK. In this case, when the initial cyclic shift value is 3 and it is determined that Φ(0)=3 and Φ(1)=9 or when the initial cyclic shift value is 9 and it is determined that Φ(0)=9 and Φ(1)=3, it is determined that 9 corresponds to the ACK and 3 corresponds to the NACK.

Optionally, a state of UCI corresponding to each cyclic shift value is determined according to the determining sequence of the at least two cyclic shift values. Specifically, the initial cyclic shift value is the first determined cyclic shift value of the at least two cyclic shift values. At least two states of the UCI include a first state. The initial cyclic shift value corresponds to the first state. For example, the formula (1) or (2) is used to determine the at least two cyclic shift values. In this case, the determining sequence of the at least two cyclic shift values is Φ(0), Φ(1), Φ(2), . . . , and the at least two cyclic shift values respectively correspond to the at least two states of the UCI according to the sequence.

For example, for one bit of ACK/NACK information, a state ACK and a state NACK correspond to two cyclic shift values. It is assumed that the formula (1) or (2) is used to determine a cyclic shift value. Φ(0) may correspond to the ACK, and Φ(1) corresponds to the NACK, so that a correspondence shown in Table 1 may be obtained:

TABLE 1

|  | ACK | NACK |
|---|---|---|
| Cyclic shift value | $C_{initial}$ | $(C_{initial} + 6)$ mod12 | where the cyclic shift difference value is 6, $C_{initial}$ is the initial cyclic shift value Φ(0), and $(C_{initial}+6)$ mod 12 is Φ(1). For example, when the initial cyclic shift value is $C_{initial}=3$ and it is determined that Φ(0)=3 and Φ(1)=9, 3 corresponds to the ACK, and 9 corresponds to the NACK. When the initial cyclic shift value is $C_{initial}=9$, and it is determined that Φ(0)=9 and Φ(1)=3, 9 corresponds to the ACK, and 3 corresponds to the NACK.

For another example, for two bits of ACK/NACK information, two data blocks respectively correspond to a state ACK and a state NACK. There are a total of four corresponding cyclic shift values. It is assumed that the formula (1) or (2) is used to determine the four cyclic shift values, namely, Φ(0), Φ(1), Φ(2), and Φ(3). A specific correspondence may be shown in Table 2:

TABLE 2

|  | ACK, ACK | ACK, NACK | NACK, NACK | NACK, ACK |
|---|---|---|---|---|
| Cyclic shift value | $C_{initial}$ | $(C_{initial} + 3)$ mod12 | $(C_{initial} + 6)$ mod12 | $(C_{initial} + 9)$ mod12 |

The two data blocks are a first data block and a second data block. The first state in each cell in the first row of Table 2 corresponds to the first data block, and the second state corresponds to the second data block. For example, "ACK, ACK" represents that the first data block is an ACK, and the second data block is also an ACK. The cyclic shift difference value is 3, and $C_{initial}$ is the initial cyclic shift value Φ(0); and $(C_{initial}+3)$ mod 12 is Φ(1), $(C_{initial}+3)$ mod 12 is Φ(2), and $(C_{initial}+9)$ mod 12 is Φ(3).

For another example, for the case of two PRBs, it is assumed that the two PRBs are the first PRB and the second PRB. In the two bits of ACK/NACK information in the first PRB, two data blocks respectively correspond to a state ACK and a state NACK, and there are a total of four corresponding cyclic shift values. It is assumed that the formula (1) or (2) is used to determine the cyclic shift values, namely, Φ(0), Φ(1), Φ(2), and Φ(3). For one bit of the SR in the second PRB, there are a positive state and a negative state. In this case, a correspondence among the two bits of ACK/NACK information in the first PRB, the one bit of the positive SR and the negative SR in the second PRB, and the cyclic shift value may be shown in the following Table 3:

TABLE 3

|  |  | ACK, ACK | ACK, NACK | NACK, NACK | NACK, ACK |
|---|---|---|---|---|---|
| Cyclic shift value | Positive SR $C'_{initial}$ | $C_{initial}$ | $(C_{initial} + 3)$ mod12 | $(C_{initial} + 6)$ mod12 | $(C_{initial} + 9)$ mod12 |
|  | Negative SR $(C'_{initial} + 6)$ mod12 | $C_{initial}$ | $(C_{initial} + 3)$ mod12 | $(C_{initial} + 6)$ mod12 | $(C_{initial} + 9)$ mod12 |

In the first PBR, the two data blocks are a first data block and a second data block. The first state in each cell in the first row of Table 3 corresponds to the first data block, and the second state corresponds to the second data block. For example, "ACK, NACK" represents that the first data block is an ACK, and the second data block is a NACK. The cyclic shift difference value is 3, and $C_{initial}$ is the initial cyclic shift value Φ(0). $(C_{initial}+3)$ mod 12 is Φ(1), $(C_{initial}+6)$ mod 12 is Φ(2), and $(C_{initial}+9)$ mod 12 is Φ(3). The initial cyclic shift value $C_{initial}'$ of the SR in the second PRB corresponds to the positive SR, and another cyclic shift value $(C_{initial}'+6)$ mod 12 corresponding to the SR corresponds to the negative SR.

In this way, the state of the corresponding UCI is determined according to the determining sequence of the at least two cyclic shift values. Different initial cyclic shift values may be set to adjust cyclic shift values corresponding to the ACK/NACK information. Because there may be an interference between close cyclic shift values, in this way, a high probability state may be prevented from being mapped to a close cyclic shift value. For example, FIG. 2 is a relatively result of a proper configuration. As may be learned from FIG. 2, A represents ACK information, C represents NACK information, and P represents a probability of the information combination. Therefore, there is a relatively large interval between corresponding cyclic shift values of ACKs of high probability states of different terminal devices.

Therefore, in the method for transmitting control information in this embodiment of this application, a network device determines a configuration of an uplink control channel sequence configured by a terminal device, and determines at least two cyclic shift values of the uplink control channel sequence according to at least one of an initial cyclic shift value, a cyclic shift difference value, and a quantity of cyclic shift values included in the configuration of the uplink control channel sequence by using a modulo operation, to determine UCI indicated by the received uplink control channel sequence sent by the terminal device. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

The method for transmitting control information according to the embodiments of this application is described above with reference to FIG. 1 and FIG. 2 from the perspective of a network device. The method for transmitting control information according to this embodiment of this application is described below with reference to FIG. 3 from the perspective of a terminal device.

FIG. 3 is a schematic flowchart of a method 200 for transmitting control information according to an embodiment of this application. The method 200 may be performed by a terminal device. As shown in FIG. 3, the method 200 includes: S210, determining a configuration of an uplink control channel sequence, where the configuration of the uplink control channel sequence includes at least one of an initial cyclic shift value, a cyclic shift difference value, and a quantity of cyclic shift values; S220, determining at least two cyclic shift values of the uplink control channel sequence according to the configuration of the uplink control channel sequence; and S230, sending UCI to a network device by using at least one of the at least two cyclic shift values.

Therefore, in the method for transmitting control information in this embodiment of this application, a terminal device determines a configuration of an uplink control channel sequence, and determines at least two cyclic shift values of the uplink control channel sequence according to at least one of an initial cyclic shift value, a cyclic shift difference value, and a quantity of cyclic shift values included in the configuration of the uplink control channel sequence, to determine UCI that needs to be sent. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

Optionally, the determining a configuration of an uplink control channel sequence includes: receiving the configuration of the uplink control channel sequence sent by the network device.

Optionally, the determining at least two cyclic shift values of the uplink control channel sequence according to the configuration of the uplink control channel sequence includes: determining the at least two cyclic shift values according to the configuration of the uplink control channel sequence by using a modulo operation.

Optionally, the determining at least two cyclic shift values of the uplink control channel sequence according to the configuration of the uplink control channel sequence includes: determining the $i^{th}$ cyclic shift value $\Phi(i)$ of the at least two cyclic shift values according to the formula (1), where $\alpha$, $i$, $\delta$, and N are all integers, $\alpha$ represents the initial cyclic shift value, $\delta$ represents the cyclic shift difference value, N represents a quantity of cyclic shifts that can be applied to the uplink control channel sequence, $0 \leq \alpha \leq N$, $0 \leq i < N$, and $0 < \delta < N$.

Optionally, the configuration of the uplink control channel sequence further includes a hopping parameter.

Optionally, the determining at least two cyclic shift values of the uplink control channel sequence according to the configuration of the uplink control channel sequence includes: determining the $i^{th}$ cyclic shift value $\Phi(i)$ of the at least two cyclic shift values according to the formula (2), where $\alpha$, $i$, $\delta$, and N are all integers, $\alpha$ represents the initial cyclic shift value, $\delta$ represents the cyclic shift difference value, N represents a quantity of cyclic shifts that can be applied to the uplink control channel sequence, h represents a hopping count determined according to the hopping parameter, $0 \leq \alpha \leq N$, $0 \leq i < N$, $0 < \delta < N$, and $0 \leq h < N$.

Optionally, the method further includes: determining the cyclic shift difference value and/or the quantity of cyclic shift values according to a quantity of data blocks that are fed back.

Optionally, the uplink control channel sequence is a sequence carrying control information.

Optionally, the sending UCI to a network device according to at least one of the at least two cyclic shift values includes: determining, in the at least two cyclic shift values, a target cyclic shift value corresponding to the UCI; determining a corresponding target uplink control channel sequence according to the target cyclic shift value; and sending the target uplink control channel sequence to the network device, where the target uplink control channel sequence is used to indicate the UCI.

Optionally, the at least two cyclic shift values are in a one-to-one correspondence with at least two states of the UCI.

Optionally, the determining, in the at least two cyclic shift values, a target cyclic shift value corresponding to the UCI includes: determining, in the at least two cyclic shift values, a target cyclic shift value corresponding to a target state of the UCI, where the target uplink control channel sequence is used to indicate the target state.

Optionally, the at least two states of the UCI include a first state, and the initial cyclic shift value corresponds to the first state.

Therefore, in the method for transmitting control information in this embodiment of this application, a terminal device determines a configuration of an uplink control channel sequence, and determines at least two cyclic shift values of the uplink control channel sequence according to at least one of an initial cyclic shift value, a cyclic shift difference value, and a quantity of cyclic shift values included in the configuration of the uplink control channel sequence by using a modulo operation, to determine a target cyclic shift value corresponding to UCI that needs to be sent, and send the uplink control channel sequence by using the target cyclic shift value. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

The method for transmitting control information according to the embodiments of this application is described above in detail with reference to FIG. 1 to FIG. 3. A network device and a terminal device according to an embodiment of this application are described below with reference to FIG. 4 to FIG. 7.

Figure 4:
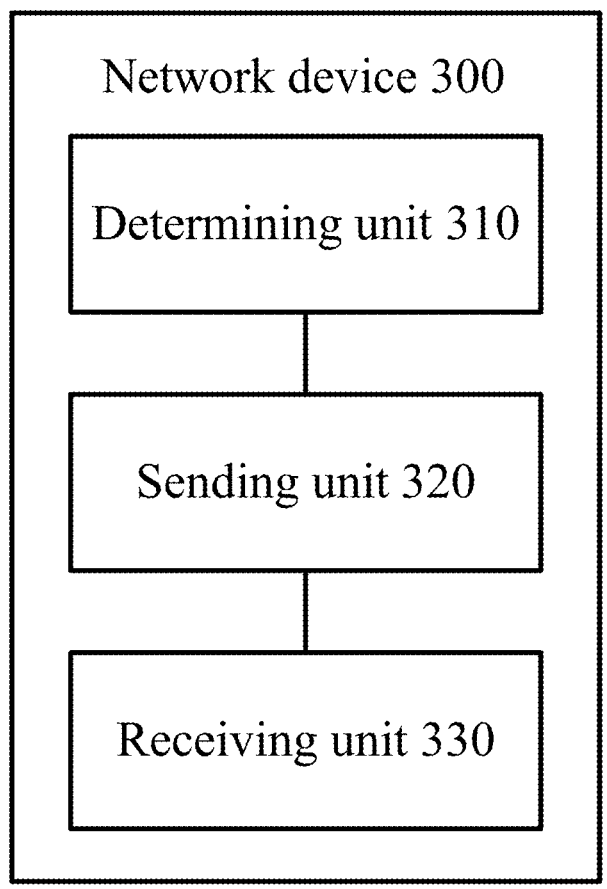
FIG. 4 is a schematic block diagram of a network device according to an embodiment of this application.

As shown in FIG. 4, a network device 300 according to an embodiment of this application includes a determining unit 310, and optionally, may further include a sending unit 320, or may include a receiving unit 330.

Specifically, the determining unit 310 is configured to determine a configuration of an uplink control channel sequence of a terminal device, where the configuration of the uplink control channel sequence includes at least one of an initial cyclic shift value, a cyclic shift difference value, and a quantity of cyclic shift values; the determining unit 310 is further configured to determine at least two cyclic shift values of the uplink control channel sequence according to the configuration of the uplink control channel sequence; and the determining unit 310 is further configured to determine, by using at least one of the at least two cyclic shift values, UCI sent by the terminal device.

Therefore, in this embodiment of this application, a network device determines a configuration of an uplink control channel sequence configured by a terminal device, and determines at least two cyclic shift values of the uplink control channel sequence according to at least one of an initial cyclic shift value, a cyclic shift difference value, and a quantity of cyclic shift values included in the configuration of the uplink control channel sequence, to determine UCI sent by the terminal device. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

Optionally, the sending unit 320 is configured to: after the determining unit 310 determines the configuration of the uplink control channel sequence of the terminal device, send at least one of the configuration of the uplink control channel sequence to the terminal device.

Optionally, the determining unit 310 is specifically configured to determine the at least two cyclic shift values according to the configuration of the uplink control channel sequence by using a modulo operation.

Optionally, the determining unit 310 is specifically configured to determine the $i^{th}$ cyclic shift value $\Phi(i)$ of the at least two cyclic shift values according to the formula (1), where $\alpha$, $i$, $\delta$, and N are all integers, $\alpha$ represents the initial cyclic shift value, $\delta$ represents the cyclic shift difference value, N represents a quantity of cyclic shifts that can be applied to the uplink control channel sequence, $0 \leq \alpha \leq N$, $0 \leq i < N$, and $0 < \delta < N$.

Optionally, the configuration of the uplink control channel sequence further includes a hopping parameter.

Optionally, the determining unit 310 is specifically configured to determine the $i^{th}$ cyclic shift value $\Phi(i)$ of the at least two cyclic shift values according to the formula (2), where $\alpha$, $i$, $\delta$, and N are all integers, $\alpha$ represents the initial cyclic shift value, $\delta$ represents the cyclic shift difference value, N represents a quantity of cyclic shifts that can be applied to the uplink control channel sequence, h represents a hopping count determined according to the hopping parameter, $0 \leq \alpha \leq N$, $0 \leq i < N$, $0 < \delta < N$, and $0 \leq h < N$.

Optionally, the determining unit 310 is specifically configured to determine the quantity of cyclic shift values and/or the cyclic shift difference value according to a quantity of data blocks that are fed back by the terminal device.

Optionally, the uplink control channel sequence is a sequence carrying control information.

Optionally, the receiving unit 330 is configured to receive a target uplink control channel sequence sent by the terminal device; and the determining unit 320 is specifically configured to: determine, in the at least two cyclic shift values, a target cyclic shift value corresponding to the target uplink control channel sequence; and determine corresponding UCI according to the target cyclic shift value.

Optionally, the at least two cyclic shift values are in a one-to-one correspondence with at least two states of the UCI.

Optionally, the determining unit 310 is specifically configured to determine, in the at least two states, that a state of the UCI corresponding to the target cyclic shift value is a target state.

Optionally, the at least two states of the UCI include a first state, and the initial cyclic shift value corresponds to the first state.

It should be understood that, the network device 300 in this embodiment of this application may correspondingly perform the method 100 in the embodiments of this application, and the foregoing operations and/or functions and other operations and/or functions of the units in the network device 300 are respectively for implementing corresponding procedures of the network device in the methods shown in FIG. 1 to FIG. 3. For brevity, details are not described herein again.

Therefore, in this embodiment of this application, a network device determines a configuration of an uplink control channel sequence configured by a terminal device, and determines at least two cyclic shift values of the uplink control channel sequence according to at least one of an initial cyclic shift value, a cyclic shift difference value, and a quantity of cyclic shift values included in the configuration of the uplink control channel sequence by using a modulo operation, to determine UCI indicated by the received uplink control channel sequence sent by the terminal device. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

Figure 5:
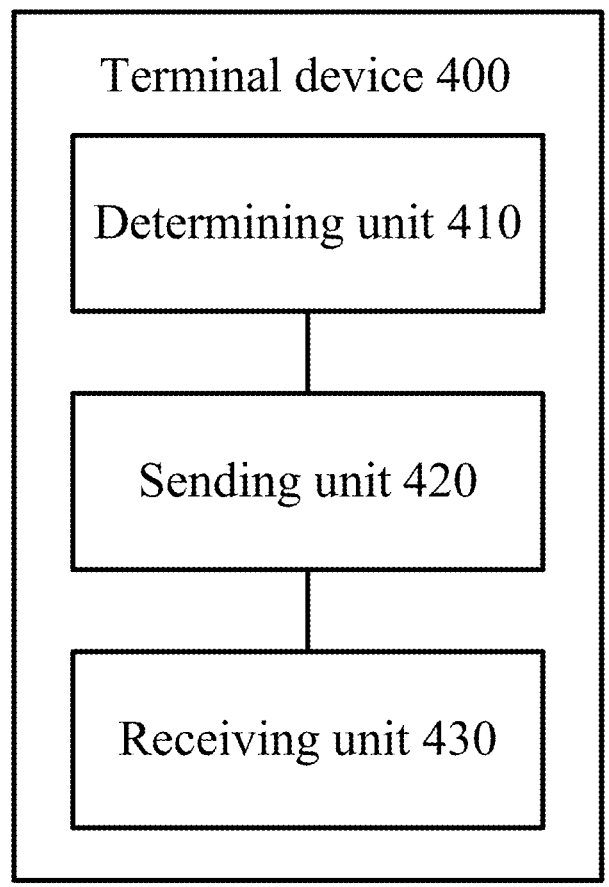
FIG. 5 is a schematic block diagram of a terminal device according to an embodiment of this application.

As shown in FIG. 5, a terminal device 400 according to an embodiment of this application includes a determining unit 410 and a sending unit 420, and optionally, may further include a receiving unit 430.

Specifically, the determining unit 410 is configured to determine a configuration of an uplink control channel sequence, where the configuration of the uplink control channel sequence includes at least one of an initial cyclic shift value, a cyclic shift difference value, and a quantity of cyclic shift values; the determining unit 410 is further configured to determine at least two cyclic shift values of the uplink control channel sequence according to the configuration of the uplink control channel sequence; and the sending unit 420 is configured to send UCI to the network device by using at least one of the at least two cyclic shift values.

Therefore, the terminal device in this embodiment of this application determines a configuration of an uplink control channel sequence, and determines at least two cyclic shift values of the uplink control channel sequence according to at least one of an initial cyclic shift value, a cyclic shift difference value, and a quantity of cyclic shift values included in the configuration of the uplink control channel sequence, to determine UCI that needs to be sent. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

Optionally, the receiving unit 430 is configured to receive the configuration of the uplink control channel sequence sent by the network device.

Optionally, the determining unit 410 is specifically configured to determine the at least two cyclic shift values according to the configuration of the uplink control channel sequence by using a modulo operation.

Optionally, the determining unit 410 is specifically configured to determine the $i^{th}$ cyclic shift value $\Phi(i)$ of the at least two cyclic shift values according to the formula (1), where $\alpha$, $i$, $\delta$, and N are all integers, $\alpha$ represents the initial cyclic shift value, $\delta$ represents the cyclic shift difference value, N represents a quantity of cyclic shifts that can be applied to the uplink control channel sequence, $0 \leq \alpha \leq N$, $0 \leq i < N$, and $0 < \delta < N$.

Optionally, the configuration of the uplink control channel sequence further includes a hopping parameter.

Optionally, the determining unit 410 is specifically configured to determine the $i^{th}$ cyclic shift value $\Phi(i)$ of the at least two cyclic shift values according to the formula (2), where $\alpha$, $i$, $\delta$, and N are all integers, $\alpha$ represents the initial cyclic shift value, $\delta$ represents the cyclic shift difference value, N represents a quantity of cyclic shifts that can be applied to the uplink control channel sequence, h represents a hopping count determined according to the hopping parameter, $0 \leq \alpha \leq N$, $0 \leq i < N$, $0 < \delta < N$, and $0 \leq h < N$.

Optionally, the determining unit 410 is specifically configured to determine the cyclic shift difference value and/or the quantity of cyclic shift values according to a quantity of data blocks that are fed back.

Optionally, the uplink control channel sequence is a sequence carrying control information.

Optionally, the determining unit 410 is specifically configured to: determine, in the at least two cyclic shift values, a target cyclic shift value corresponding to the UCI; determine a corresponding target uplink control channel sequence according to the target cyclic shift value; and the sending unit 420 is specifically configured to send the target uplink control channel sequence to the network device, where the target uplink control channel sequence is used to indicate the UCI.

Optionally, the at least two cyclic shift values are in a one-to-one correspondence with at least two states of the UCI.

Optionally, the determining unit 410 is specifically configured to determine, in the at least two cyclic shift values, a target cyclic shift value corresponding to a target state of the UCI.

Optionally, the at least two states of the UCI include a first state, and the initial cyclic shift value corresponds to the first state.

It should be understood that, the terminal device 400 in this embodiment of this application may correspondingly perform the method 200 in the embodiments of this application, and the foregoing operations and/or functions and other operations and/or functions of the units in the terminal device 400 are respectively for implementing corresponding procedures of the terminal device in the methods shown in FIG. 1 to FIG. 3. For brevity, details are not described herein again.

Therefore, in this embodiment of this application, a terminal device determines a configuration of an uplink control channel sequence, and determines at least two cyclic shift values of the uplink control channel sequence according to at least one of an initial cyclic shift value, a cyclic shift difference value, and a quantity of cyclic shift values included in the configuration of the uplink control channel sequence by using a modulo operation, to determine a target cyclic shift value corresponding to UCI that needs to be sent, and send the uplink control channel sequence by using the target cyclic shift value. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

Figure 6:
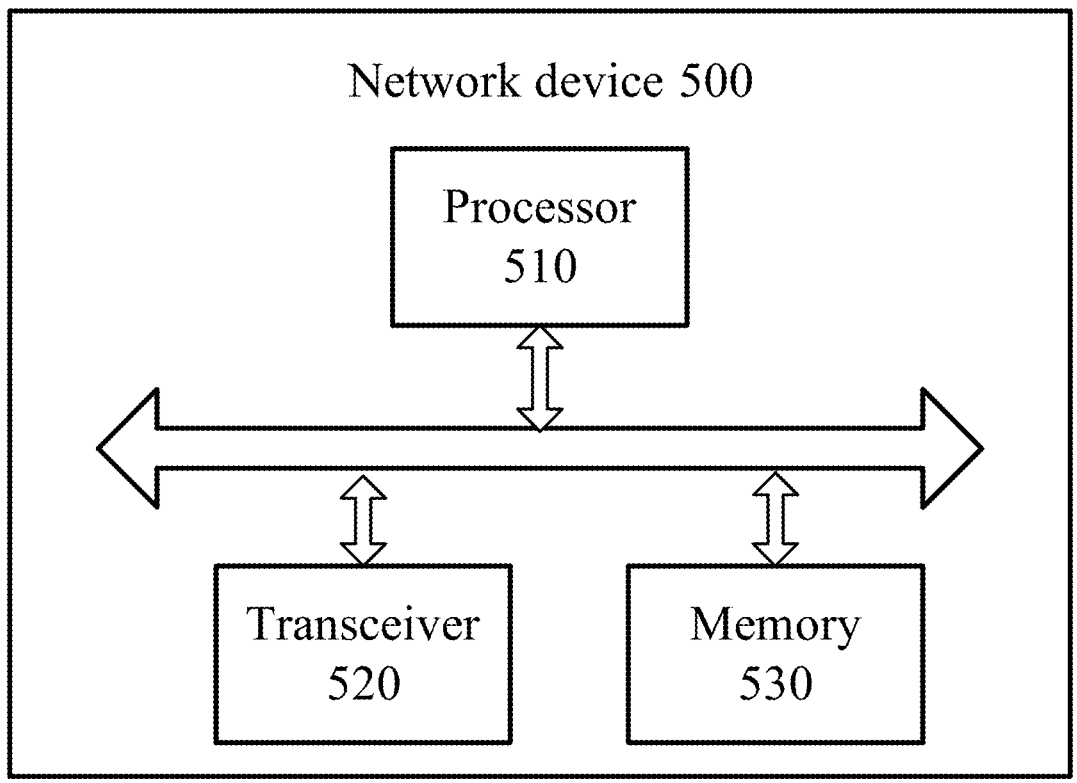
FIG. 6 is another schematic block diagram of a network device according to an embodiment of this application.

FIG. 6 is a schematic block diagram of a network device 500 according to an embodiment of this application. As shown in FIG. 6, the network device 500 includes a processor 510 and a transceiver 520. The processor 510 is connected to the transceiver 520. Optionally, the network device 500 further includes a memory 530. The memory 530 is connected to the processor 510. The processor 510, the memory 530, and the transceiver 520 communicate with each other through internal connection channels to transfer control and/or data signals. The memory 530 may be configured to store an instruction. The processor 510 is configured to execute the instruction stored in the memory 530, to control the transceiver 520 to send information or a signal. The processor 510 is configured to: determine a configuration of an uplink control channel sequence of a terminal device, where the configuration of the uplink control channel sequence includes at least one of an initial cyclic shift value, a cyclic shift difference value, and a quantity of cyclic shift values; determine at least two cyclic shift values of the uplink control channel sequence according to the configuration of the uplink control channel sequence; and determine, by using at least one of the at least two cyclic shift values, UCI sent by the terminal device.

Therefore, the network device in this embodiment of this application determines a configuration of an uplink control channel sequence configured by a terminal device, and determines at least two cyclic shift values of the uplink control channel sequence according to at least one of an initial cyclic shift value, a cyclic shift difference value, and a quantity of cyclic shift values included in the configuration of the uplink control channel sequence, to determine UCI sent by the terminal device. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

Optionally, in an embodiment, the transceiver 520 is configured to: after the processor 510 determines the configuration of the uplink control channel sequence of the terminal device, send at least one of the configuration of the uplink control channel sequence to the terminal device.

Optionally, in an embodiment, the processor 510 is configured to determine the at least two cyclic shift values according to the configuration of the uplink control channel sequence by using a modulo operation.

Optionally, in an embodiment, the processor 510 is configured to determine the $i^{th}$ cyclic shift value $\Phi(i)$ of the at least two cyclic shift values according to the formula (1), where $\alpha$, $i$, $\delta$, and $N$ are all integers, $\alpha$ represents the initial cyclic shift value, $\delta$ represents the cyclic shift difference value, $N$ represents a quantity of cyclic shifts that can be applied to the uplink control channel sequence, $0 \leq \alpha \leq N$, $0 \leq i < N$, and $0 < \delta < N$.

Optionally, in an embodiment, the configuration of the uplink control channel sequence further includes a hopping parameter.

Optionally, in an embodiment, the processor 510 is configured to determine the $i^{th}$ cyclic shift value $\Phi(i)$ of the at least two cyclic shift values according to the formula (2), where $\alpha$, $i$, $\delta$, and $N$ are all integers, $\alpha$ represents the initial cyclic shift value, $\delta$ represents the cyclic shift difference value, $N$ represents a quantity of cyclic shifts that can be applied to the uplink control channel sequence, $h$ represents a hopping count determined according to the hopping parameter, $0 \leq \alpha \leq N$, $0 \leq i < N$, $0 < \delta < N$, and $0 \leq h < N$.

Optionally, in an embodiment, the processor 510 is configured to determine the quantity of cyclic shift values and/or the cyclic shift difference value according to a quantity of data blocks that are fed back by the terminal device.

Optionally, in an embodiment, the uplink control channel sequence is a sequence carrying control information.

Optionally, in an embodiment, the transceiver 520 is configured to receive a target uplink control channel sequence sent by the terminal device; and the processor 510 is configured to: determine, in the at least two cyclic shift values, a target cyclic shift value corresponding to the target uplink control channel sequence; and determine corresponding UCI according to the target cyclic shift value.

Optionally, in an embodiment, the at least two cyclic shift values are in a one-to-one correspondence with at least two states of the UCI.

Optionally, in an embodiment, the processor 510 is configured to determine, in the at least two states, that a state of the UCI corresponding to the target cyclic shift value is a target state.

Optionally, in an embodiment, the at least two states of the UCI include a first state, and the initial cyclic shift value corresponds to the first state.

It should be understood that, the network device 500 in this embodiment of this application may correspond to the network device 300 in the embodiments of this application, and may correspond to the corresponding body that performs the method 100 in the embodiments of this application, and the foregoing operations and/or functions and other operations and/or functions of the units in the network device 500 are respectively for implementing corresponding procedures of the network device in the methods shown in FIG. 1 to FIG. 3. For brevity, details are not described herein again.

Therefore, in this embodiment of this application, a network device determines a configuration of an uplink control channel sequence configured by a terminal device, and determines at least two cyclic shift values of the uplink control channel sequence according to at least one of an initial cyclic shift value, a cyclic shift difference value, and a quantity of cyclic shift values included in the configuration of the uplink control channel sequence by using a modulo operation, to determine UCI indicated by the received uplink control channel sequence sent by the terminal device. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

Figure 7:
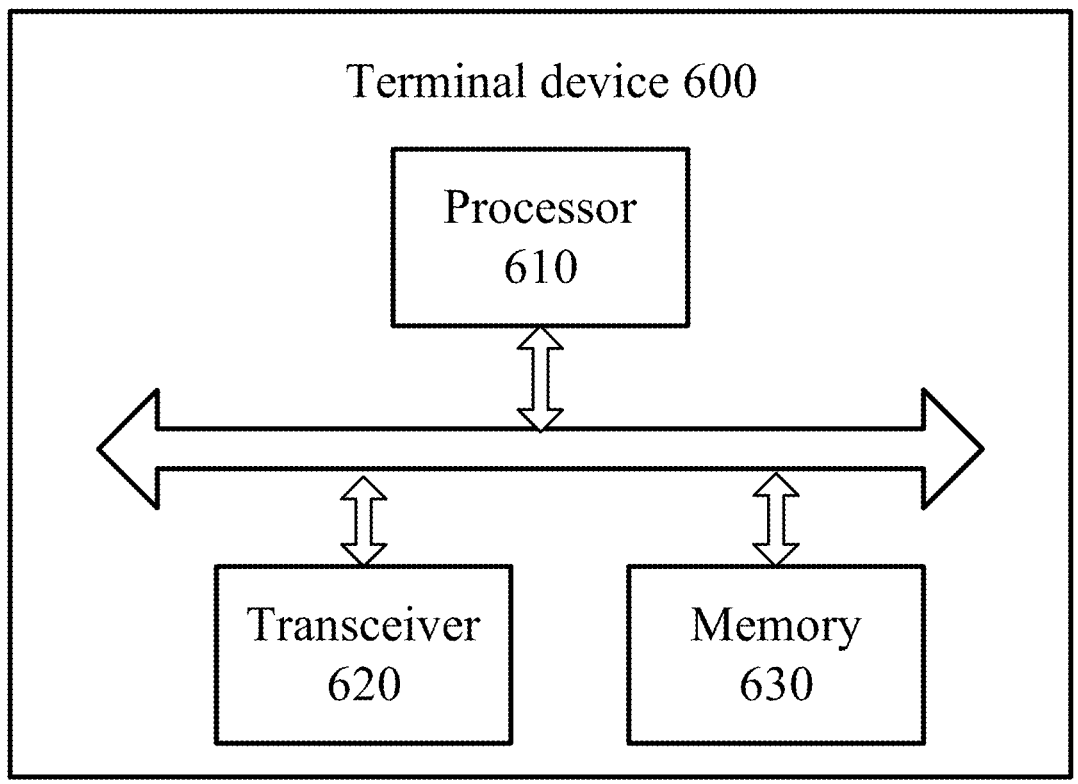
FIG. 7 is another schematic block diagram of a terminal device according to an embodiment of this application.

FIG. 7 is a schematic block diagram a terminal device 600 according to an embodiment of this application. As shown in FIG. 7, the terminal device 600 includes a processor 610 and a transceiver 620. The processor 610 is connected to the transceiver 620. Optionally, the terminal device 600 further includes a memory 630. The memory 630 is connected to the processor 610. The processor 610, the memory 630, and the transceiver 620 communicate with each other through internal connection channels to transfer control and/or data signals. The memory 630 may be configured to store an instruction. The processor 610 is configured to execute the instruction stored in the memory 630, to control the transceiver 620 to send information or a signal. The processor 610 is configured to: determine a configuration of an uplink control channel sequence, where the configuration of the uplink control channel sequence includes at least one of an initial cyclic shift value, a cyclic shift difference value, and a quantity of cyclic shift values; and determine at least two cyclic shift values of the uplink control channel sequence according to the configuration of the uplink control channel sequence. The transceiver 620 is configured to send UCI to a network device by using at least one of the at least two cyclic shift values.

Therefore, the terminal device in this embodiment of this application determines a configuration of an uplink control channel sequence, and determines at least two cyclic shift values of the uplink control channel sequence according to at least one of an initial cyclic shift value, a cyclic shift difference value, and a quantity of cyclic shift values included in the configuration of the uplink control channel sequence, to determine UCI that needs to be sent. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

Optionally, in an embodiment, the transceiver 620 is configured to receive the configuration of the uplink control channel sequence sent by the network device.

Optionally, in an embodiment, the processor 610 is configured to determine the at least two cyclic shift values according to the configuration of the uplink control channel sequence by using a modulo operation.

Optionally, in an embodiment, the processor 610 is configured to determine the $i^{th}$ cyclic shift value $\Phi(i)$ of the at least two cyclic shift values according to the formula (1), where $\alpha$, $i$, $\delta$, and $N$ are all integers, $\alpha$ represents the initial cyclic shift value, $\delta$ represents the cyclic shift difference value, $N$ represents a quantity of cyclic shifts that can be applied to the uplink control channel sequence, $0 \leq \alpha \leq N$, $0 \leq i < N$, and $0 < \delta < N$.

Optionally, in an embodiment, the configuration of the uplink control channel sequence further includes a hopping parameter.

Optionally, in an embodiment, the processor 610 is configured to determine the $i^{th}$ cyclic shift value $\Phi(i)$ of the at least two cyclic shift values according to the formula (2), where $\alpha$, $i$, $\delta$, and $N$ are all integers, $\alpha$ represents the initial cyclic shift value, δ represents the cyclic shift difference value, N represents a quantity of cyclic shifts that can be applied to the uplink control channel sequence, h represents a hopping count determined according to the hopping parameter, $0 \leq \alpha \leq N$, $0 \leq i < N$, $0 < \delta < N$, and $0 \leq h < N$.

Optionally, in an embodiment, the processor 610 is configured to determine the cyclic shift difference value and/or the quantity of cyclic shift values according to a quantity of data blocks that are fed back.

Optionally, in an embodiment, the uplink control channel sequence is a sequence carrying control information.

Optionally, in an embodiment, the processor 610 is configured to: determine, in the at least two cyclic shift values, a target cyclic shift value corresponding to the UCI; and determine a corresponding target uplink control channel sequence according to the target cyclic shift value; and the transceiver 620 is configured to send the target uplink control channel sequence to the network device, where the target uplink control channel sequence is used to indicate the UCI.

Optionally, in an embodiment, the at least two cyclic shift values are in a one-to-one correspondence with at least two states of the UCI.

Optionally, in an embodiment, the processor 610 is configured to determine, in the at least two cyclic shift values, a target cyclic shift value corresponding to a target state of the UCI.

Optionally, in an embodiment, the at least two states of the UCI include a first state, and the initial cyclic shift value corresponds to the first state.

It should be understood that, the terminal device 600 in this embodiment of this application may correspond to the terminal device 400 in the embodiments of this application, and may correspond to the corresponding body that performs the method 200 in the embodiments of this application, and the foregoing operations and/or functions and other operations and/or functions of the units in the terminal device 600 are respectively for implementing corresponding procedures of the terminal device in the methods shown in FIG. 1 to FIG. 3. For brevity, details are not described herein again.

Therefore, the terminal device in this embodiment of this application determines a configuration of an uplink control channel sequence, and determines at least two cyclic shift values of the uplink control channel sequence according to at least one of an initial cyclic shift value, a cyclic shift difference value, and a quantity of cyclic shift values included in the configuration of the uplink control channel sequence by using a modulo operation, to determine a target cyclic shift value corresponding to UCI that needs to be sent, and send the uplink control channel sequence by using the target cyclic shift value. In this way, a relatively small quantity of configurations may be used to determine a plurality of cyclic shift values, so that configuration sets for a PUCCH are reduced, and overheads of a physical layer are reduced. Further, with limited indication overheads of a physical layer, PUCCH resources can be configured more flexibly.

It should be noted that the method embodiments of this application may be applied to a processor, or implemented by a processor. The processor may be an integrated circuit chip and has a signal processing capability. During implementation, the steps of the method embodiment may be implemented by using a hardware integrated logic circuit in the processor or implemented by using an instruction in a software form. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform methods, steps and logical block diagrams disclosed in the embodiments of this application. The general purpose processor may be a microprocessor or the processor may be any conventional processor and the like. Steps of the methods disclosed with reference to the embodiments of this application may be directly executed and completed by means of a hardware decoding processor, or may be executed and completed by using a combination of hardware and software modules in the decoding processor. The software module may be located in a mature storage medium in the field, such as a random access memory (RAM), a flash memory, a read-only memory (ROM), a programmable ROM (PROM), an electrically-erasable programmable memory or a register. The storage medium is located in the memory, and the processor reads information in the memory and completes the steps in the methods in combination with hardware of the processor.

It can be understood that, the memory in the embodiments of this application may be a volatile memory or a non-volatile memory, or may include both a volatile memory and a non-volatile memory. The non-volatile memory may be a ROM, a PROM, an erasable PROM (EPROM), an electrically EPROM (EEPROM) or a flash memory. The volatile memory may be a RAM, used as an external cache. By way of example rather than limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that, the memory for the system and the method described herein aims to include but not limited to these memories and any other suitable types of memories.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device or the like) to perform all or some of the steps of the method described in the embodiments of this application. The foregoing storage medium includes: any medium that can store program codes, such as a USB flash disk, a removable hard disk, a ROM, a RAM, a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting control information, the method comprising:
   determining, by a network device, a cyclic shift value for receiving uplink control information (UCI) from a terminal device according to a configuration of an uplink control channel sequence; wherein the cyclic shift value is one of at least two cyclic shift values determined by modulo operation according to the configuration of the uplink control channel sequence and wherein the configuration of the uplink control channel sequence comprises at least one of a hopping parameter, an initial cyclic shift value, a cyclic shift difference value, or a quantity of cyclic shift values; and
   receiving the UCI from a terminal device according to the determined cyclic shift value,
   wherein an $i^{th}$ cyclic shift value $\Phi(i)$: of the at least two cyclic shift values is:

$$\Phi(i)=(\alpha+i*\delta+h) \bmod N; \text{ and}$$

wherein $\alpha$, $i$, $\delta$, and N are all integers, $\alpha$ represents the initial cyclic shift value, $\delta$ represents the cyclic shift difference value, N represents a quantity of cyclic shifts that can be applied to the uplink control channel sequence, h represents a hopping count determined according to the hopping parameter, $0 \leq \alpha \leq N$, $0 \leq i < N$, $0 < \delta < N$, and $0 \leq h < N$.

2. The method of claim 1 wherein after determining a configuration of an uplink control channel sequence of a terminal device, the method further comprises:
   sending at least one of the initial cyclic shift value, the cyclic shift difference value, or the quantity of cyclic shift values to the terminal device.

3. The method of claim 1 wherein the UCI comprises ACK/NACK information and when 1 bit of the ACK/NACK information is needed to be fed back by the terminal device, the at least two cyclic shift values of the uplink control channel sequence comprise two cyclic shift values, where "i" is 0 or 1 and "$\delta$"=6.

4. The method of claim 1 wherein the UCI comprise ACK/NACK information and when 2 bits of the ACK/NACK information are needed to be fed back by the terminal device, the at least two cyclic shift values of the uplink control channel sequence comprise four cyclic shift values, where "i" is 0, 1, 2 or 3 and "$\delta$"=3.

5. A method for transmitting control information by a terminal device, the method comprising:
   determining, by the terminal device, a configuration of an uplink control channel sequence, wherein the configuration of the uplink control channel sequence comprises at least one of a hopping parameter, an initial cyclic shift value, a cyclic shift difference value, or a quantity of cyclic shift values;
   determining, by the terminal device, a cyclic shift value for sending uplink control information (UCI) to a network device according to the configuration of the uplink control channel sequence, wherein the cyclic shift value is one of at least two cyclic shift values determined by modulo operation according to the configuration of the uplink control channel sequence; and
   sending the UCI to the network device by using the cyclic shift value,
   wherein an $i^{th}$ cyclic shift value $\Phi(i)$: of the at least two cyclic shift values is:

$$\Phi(i)=(\alpha+i*\delta+h) \bmod N;$$

wherein $\alpha$, $i$, $\delta$, and N are all integers, $\alpha$ represents the initial cyclic shift value, $\delta$ represents the cyclic shift difference value, N represents a quantity of cyclic shifts that can be applied to the uplink control channel sequence, h represents a hopping count determined according to the hopping parameter, $0 \leq \alpha \leq N$, $0 \leq i < N$, $0 < \delta < N$, and $0 \leq h < N$.

6. The method of claim 5, wherein determining a configuration of an uplink control channel sequence comprises:
   receiving the configuration of the uplink control channel sequence sent by the network device.

7. The method of claim 5, wherein the UCI comprises ACK/NACK information and when 1 bit of the ACK/NACK information is needed to be fed back by the terminal device, the at least two cyclic shift values of the uplink control channel sequence comprise two cyclic shift values, where "i" is 0 or 1 and "$\delta$"=6.

8. The method of claim 5, wherein the UCI comprise ACK/NACK information and when 2 bits of the ACK/NACK information are needed to be fed back by the terminal device, the at least two cyclic shift values of the uplink control channel sequence comprise four cyclic shift values, where "i" is 0, 1, 2 or 3 and "$\delta$"=3.

9. A network device comprising:
   a transceiver;
   a memory configured to store computer-executable instructions; and
   one or more processors in communication with the transceiver and the memory and configured to execute the computer-executable instructions to at least:

determine a cyclic shift value for receiving uplink control information (UCI) from a terminal device according to a configuration of an uplink control channel sequence; wherein the cyclic shift value is one of at least two cyclic shift values determined by modulo operation according to the configuration of the uplink control channel sequence and wherein the configuration of the uplink control channel sequence comprises at least one of a hopping parameter, an initial cyclic shift value, a cyclic shift difference value, or a quantity of cyclic shift values; and wherein the transceiver is configured to receive the UCI from a terminal device according to the determined cyclic shift value, wherein an $i^{th}$ cyclic shift value $\Phi(i)$: of the at least two cyclic shift values is:

$$\Phi(i)=(\alpha+i*\delta+h)\bmod N;$$

wherein $\alpha$, i, $\delta$, and N are all integers, $\alpha$ represents the initial cyclic shift value, $\delta$ represents the cyclic shift difference value, N represents a quantity of cyclic shifts that can be applied to the uplink control channel sequence, h represents a hopping count determined according to the hopping parameter, $0 \leq \alpha \leq N$, $0 \leq i < N$, $0 < \delta < N$, and $0 \leq h < N$.

10. The network device of claim 9, wherein the UCI comprises ACK/NACK information and when 1 bit of the ACK/NACK information is needed to be fed back by the terminal device, the at least two cyclic shift values of the uplink control channel sequence comprise two cyclic shift values, where "i" is 0 or 1 and "$\delta$"=6.

11. The network device of claim 9, wherein the UCI comprise ACK/NACK information and when 2 bits of the ACK/NACK information are needed to be fed back by the terminal device, the at least two cyclic shift values of the uplink control channel sequence comprise four cyclic shift values, where "i" is 0, 1, 2 or 3 and "$\delta$"=3.

12. A terminal device comprising:
a transceiver;
a memory configured to store computer-executable instructions; and
one or more processors in communication with the transceiver and the memory and configured to execute the computer-executable instructions to at least:
determine a configuration of an uplink control channel sequence, wherein the configuration of the uplink control channel sequence comprises at least one of a hopping parameter, an initial cyclic shift value, a cyclic shift difference value, or a quantity of cyclic shift values;
determine a cyclic shift value for sending uplink control information (UCI) to a network device according to the configuration of the uplink control channel sequence, wherein the cyclic shift value is one of at least two cyclic shift values determined by modulo operation according to the configuration of the uplink control channel sequence; and
wherein the transceiver is configured to send the UCI to the network device by using the cyclic shift value wherein an $i^{th}$ cyclic shift value $\Phi(i)$: of the at least two cyclic shift values is:

$$\Phi(i)=(\alpha+i*\delta+h)\bmod N;\text{ and}$$

wherein $\alpha$, i, $\delta$, and N are all integers, $\alpha$ represents the initial cyclic shift value, $\delta$ represents the cyclic shift difference value, N represents a quantity of cyclic shifts that can be applied to the uplink control channel sequence, h represents a hopping count determined according to the hopping parameter, $0 \leq \alpha \leq N$, $0 \leq i < N$, $0 < \delta < N$ and $0 \leq h < N$.

13. The terminal device of claim 12, wherein the UCI comprises ACK/NACK information and when 1 bit of the ACK/NACK information is needed to be fed back by the terminal device, the at least two cyclic shift values of the uplink control channel sequence comprise two cyclic shift values, where "i" is 0 or 1 and "$\delta$"=6.

14. The terminal device of claim 12, wherein the UCI comprise ACK/NACK information and when 2 bits of the ACK/NACK information are needed to be fed back by the terminal device, the at least two cyclic shift values of the uplink control channel sequence comprise four cyclic shift values, where "i" is 0, 1, 2 or 3 and "$\delta$"=3.

* * * * *